United States Patent
Hagiwara

(10) Patent No.: US 8,817,163 B2
(45) Date of Patent: Aug. 26, 2014

(54) FOREIGN SUBSTANCE REMOVAL APPARATUS AND OPTICAL APPARATUS INCLUDING THE SAME

(75) Inventor: Shinichi Hagiwara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 13/421,466

(22) Filed: Mar. 15, 2012

(65) Prior Publication Data

US 2012/0236196 A1  Sep. 20, 2012

(30) Foreign Application Priority Data

Mar. 17, 2011 (JP) ................................. 2011-059218

(51) Int. Cl.
*H04N 5/225* (2006.01)
(52) U.S. Cl.
USPC ............................ 348/340; 348/374; 348/351
(58) Field of Classification Search
None
See application file for complete search history.

(56) References Cited

U.S. PATENT DOCUMENTS

2004/0012714 A1   1/2004   Kawai

FOREIGN PATENT DOCUMENTS

| CN | 1462145 A | 12/2003 |
|---|---|---|
| CN | 101344641 A | 1/2009 |
| CN | 101542889 A | 9/2009 |
| JP | 2000-166265 A | 6/2000 |
| JP | 2007-050352 A | 3/2007 |
| JP | 2008-207170 A | 9/2008 |
| JP | 2008207170 A * | 9/2008 |

* cited by examiner

*Primary Examiner* — Roberto Velez
*Assistant Examiner* — Yih-Sien Kao
(74) *Attorney, Agent, or Firm* — Canon USA Inc. IP Division

(57) ABSTRACT

A measuring unit measures an amount of a detected phase difference from an output of a vibration detection signal from a first detection electrode until an output of a vibration detection signal from a second detection electrode. A setting unit sets a second driving phase difference amount based on the detected phase difference amount measured by the measuring unit when the setting unit sets a first driving phase difference amount set in advance. A first voltage applied by a drive unit to the first drive electrode and the second drive electrode when the setting unit sets the first driving phase difference amount, is lower than a second voltage applied by the drive unit to the first drive electrode and the second drive electrode when the setting unit sets the second driving phase difference amount.

4 Claims, 9 Drawing Sheets

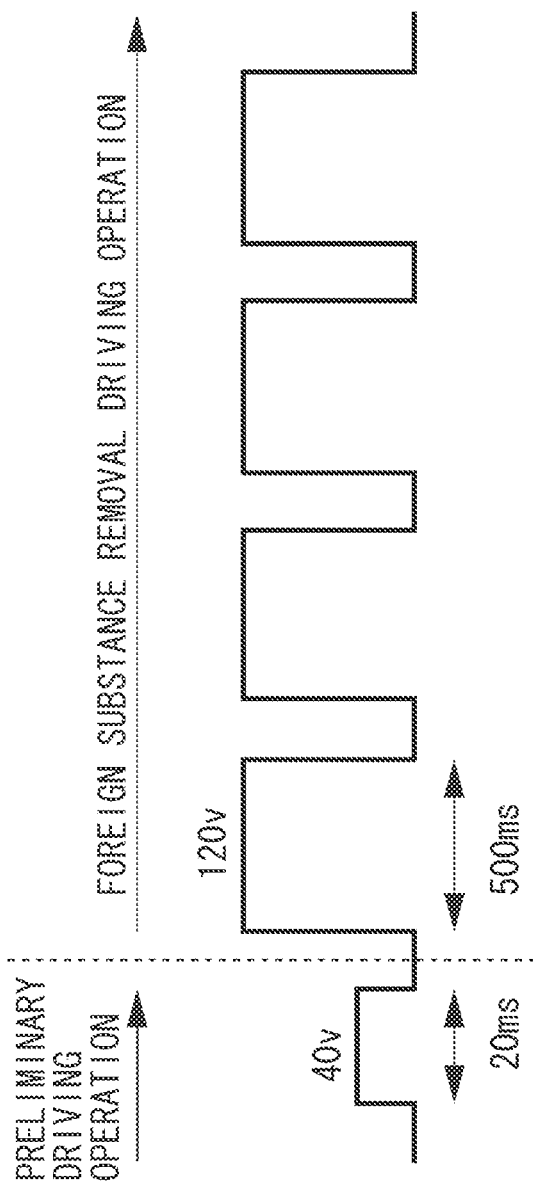

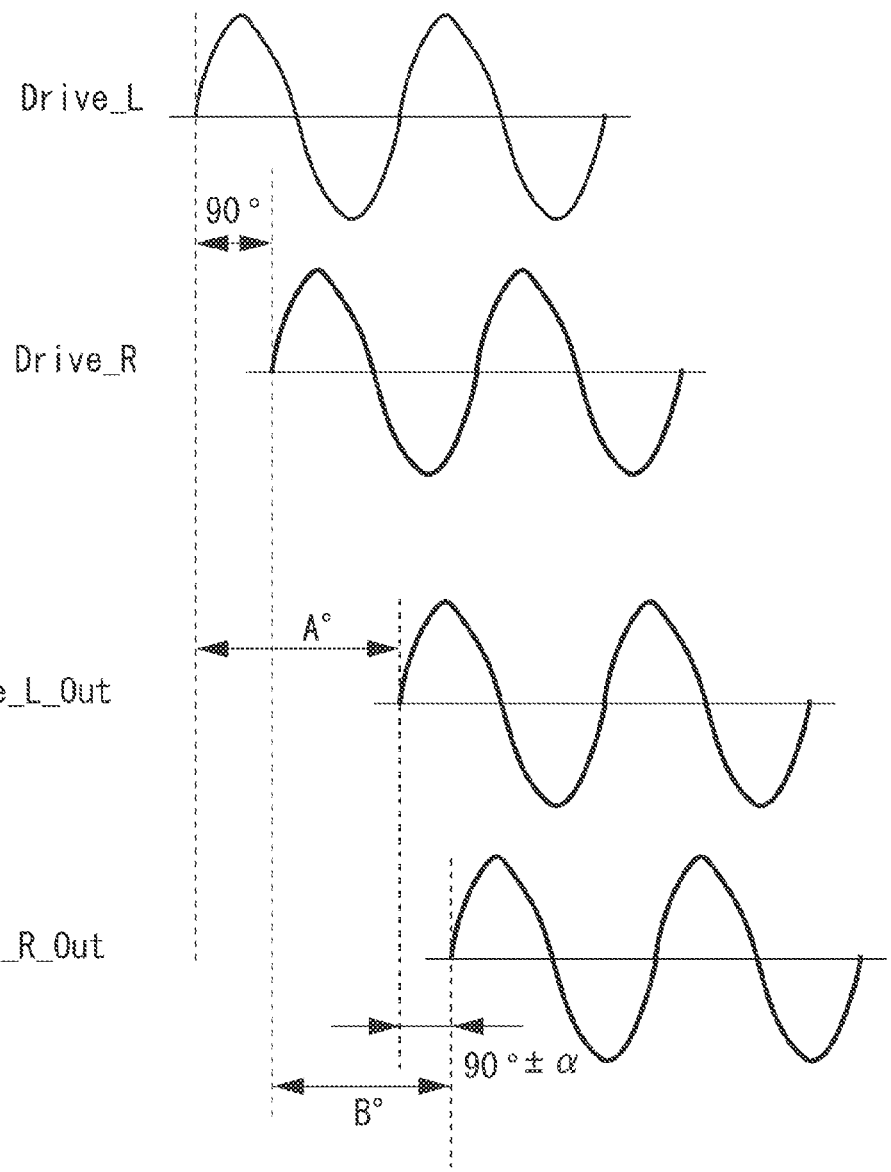

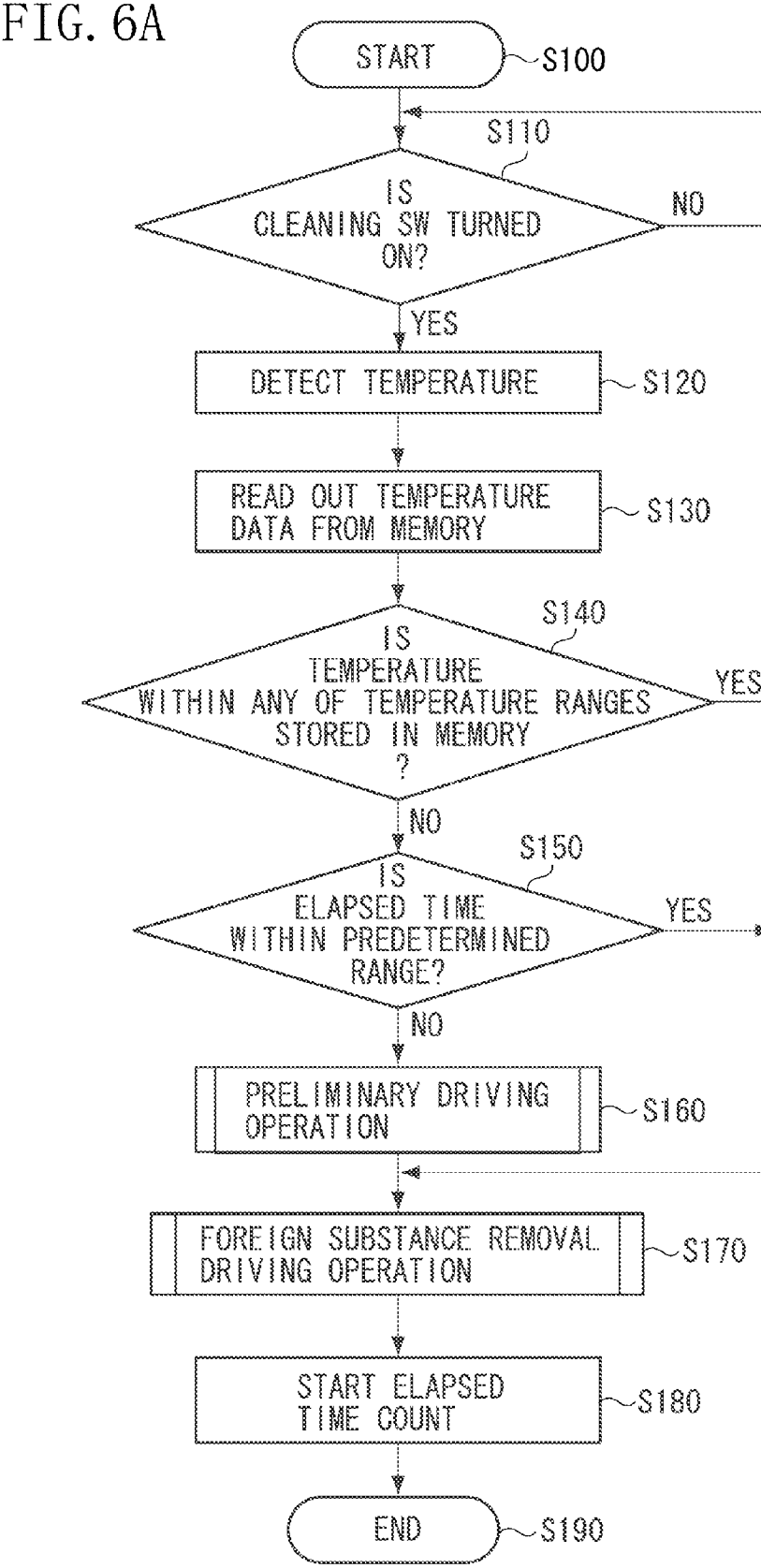

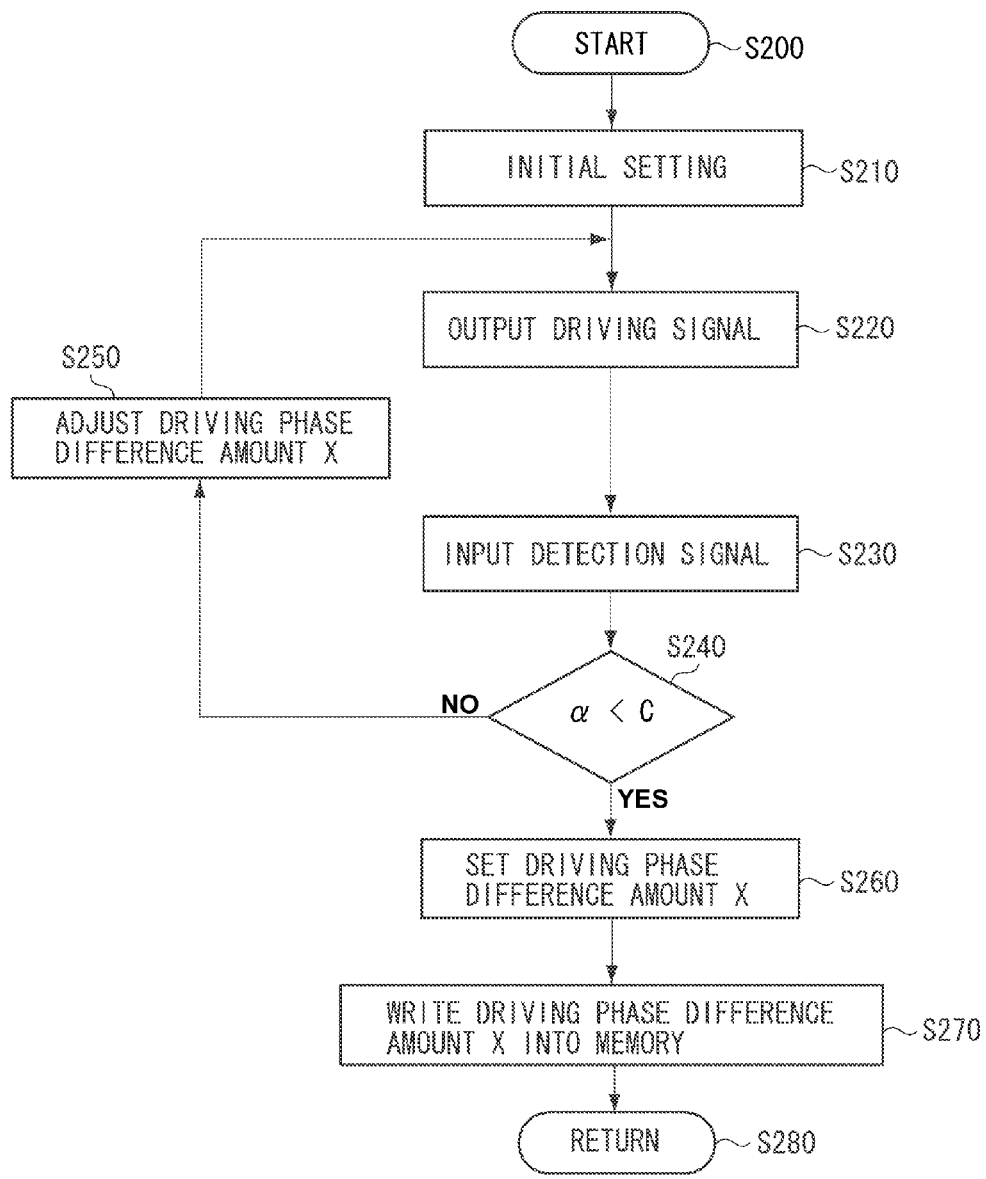

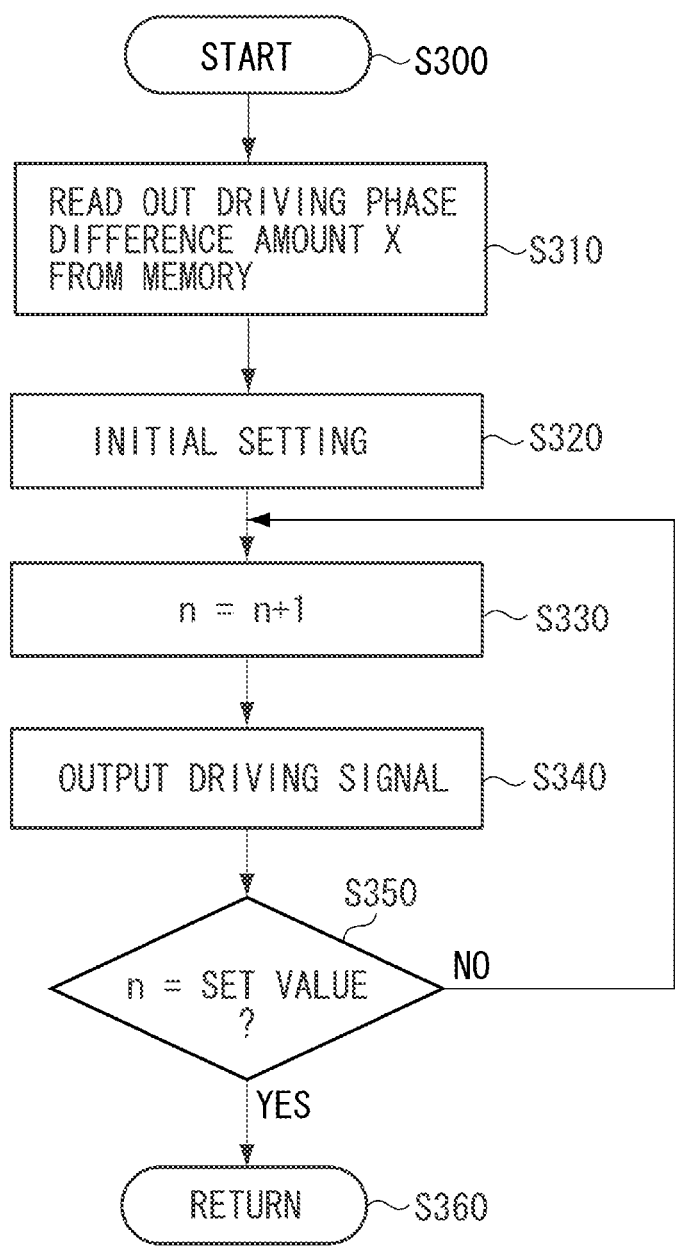

FOREIGN SUBSTANCE REMOVAL APPARATUS AND OPTICAL APPARATUS INCLUDING THE SAME

BACKGROUND OF THE INVENTION

1. Field of the Invention

The present invention relates to a foreign substance removal apparatus capable of eliminating a foreign substance such as dust or dirt, and an optical apparatus including the foreign substance removal apparatus.

2. Description of the Related Art

In optical apparatuses such as digital cameras, the optical apparatus converts an object image into an electric signal to capture the object image, receives an imaging light flux on an image sensor, and converts the photoelectrically converted signal output from the image sensor into image data. Such an imaging apparatus includes an optical low-pass filter and an infrared absorption filter disposed at the object side of the image sensor.

When a foreign substance such as dust or dirt is attached to any of the surfaces of these filters, this results in generation of a black spot in a captured image from the attached portion, thereby deteriorating the visibility of the image.

Especially, in interchangeable-lens digital single lens reflex cameras, mechanically operating units such as a shutter and a quick return mirror are disposed in the vicinity of the image sensor, so that a foreign substance such as dust or dirt produced from these operating units may be attached to the surface of an optical member such as the image sensor and the filter. Further, at the time of a lens exchange, a foreign substance such as dust or dirt may enter from an opening of a lens mount into a camera main body, and may be attached to the surface of the optical member eventually.

To prevent this phenomenon from occurring, it is known to vibrate the optical member disposed at the object side of the image sensor with use of a piezoelectric element to remove the foreign substance such as dust or dirt attached on the surface of the optical member.

Japanese Patent Application Laid-Open No. 2008-207170 discusses a technique of generating a travelling wave at an optical member by causing a first bending vibration and a second bending vibration, which has a next higher or lower order than the order of the first bending vibration and is out of time phase with the first bending vibration by 90°, at the optical member.

On the other hand, the second bending vibration should be different in time phase with the first bending vibration by exactly 90° to generate a stabilized traveling wave at the optical member. Further, a higher voltage should be applied to the piezoelectric element to remove a foreign substance by generating a traveling wave at the optical member, than a voltage applied to remove a foreign substance by generating a stationary wave at the optical member.

However, exciting the first bending vibration and the second bending vibration in such a manner that the second bending vibration fails to be different in time phase with the first bending vibration by exactly 90° may result in breakage of the optical member.

SUMMARY OF THE INVENTION

According to an aspect of the present invention, a foreign substance removal apparatus includes an optical member, a first piezoelectric element attached to the optical member and including a first drive electrode and a first detection electrode formed thereon, a second piezoelectric element attached to the optical member and including a second drive electrode and a second detection electrode formed thereon, a drive unit configured to apply power to the first drive electrode to drive the first piezoelectric element, and apply power to the second drive electrode to drive the second piezoelectric element, a vibration detection unit configured to detect a vibration of the optical member based on outputs from the first detection electrode and the second detection electrode, a setting unit configured to set an amount of a driving phase difference from power application to the first drive electrode until power application to the second drive electrode, and a measuring unit configured to measure an amount of a detected phase difference from detection of the vibration of the optical member by the vibration detection unit based on the output from the first detection electrode, until detection of the vibration of the optical member by the vibration detection unit based on the output from the second detection electrode. The setting unit sets a first driving phase difference amount which is set in advance. The setting unit sets a second driving phase difference amount based on the detected phase difference amount measured by the measuring unit when the setting unit sets the first driving phase difference amount. The drive unit applies a first voltage to the first drive electrode and the second drive electrode when the setting unit sets the first driving phase difference amount. The drive unit applies a second voltage to the first drive electrode and the second drive electrode when the setting unit sets the second driving phase difference amount. The first voltage is lower than the second voltage.

According to the present invention, it is possible to prevent the optical member from being broken even if the optical member has the first bending vibration and the second bending vibration that is not out of time phase with the first bending vibration by exactly 90°.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a timing chart illustrating a preliminary driving operation and a foreign substance removal driving operation.

FIGS. 5A and 5B illustrate driving signals Drive_L and Drive_R, and detection signals Sense_L_Out and Sense_R_Out issued during the preliminary driving operation.

FIGS. 6A, 6B, and 6C are flowcharts illustrating a foreign substance removal operation according to the first exemplary embodiment.

DESCRIPTION OF THE EMBODIMENTS

Various exemplary embodiments, features, and aspects of the invention will be described in detail below with reference to the drawings.

A digital camera will be described as an example of an optical apparatus including a foreign substance removal apparatus according to an exemplary embodiment of the present invention.

Figure 1:
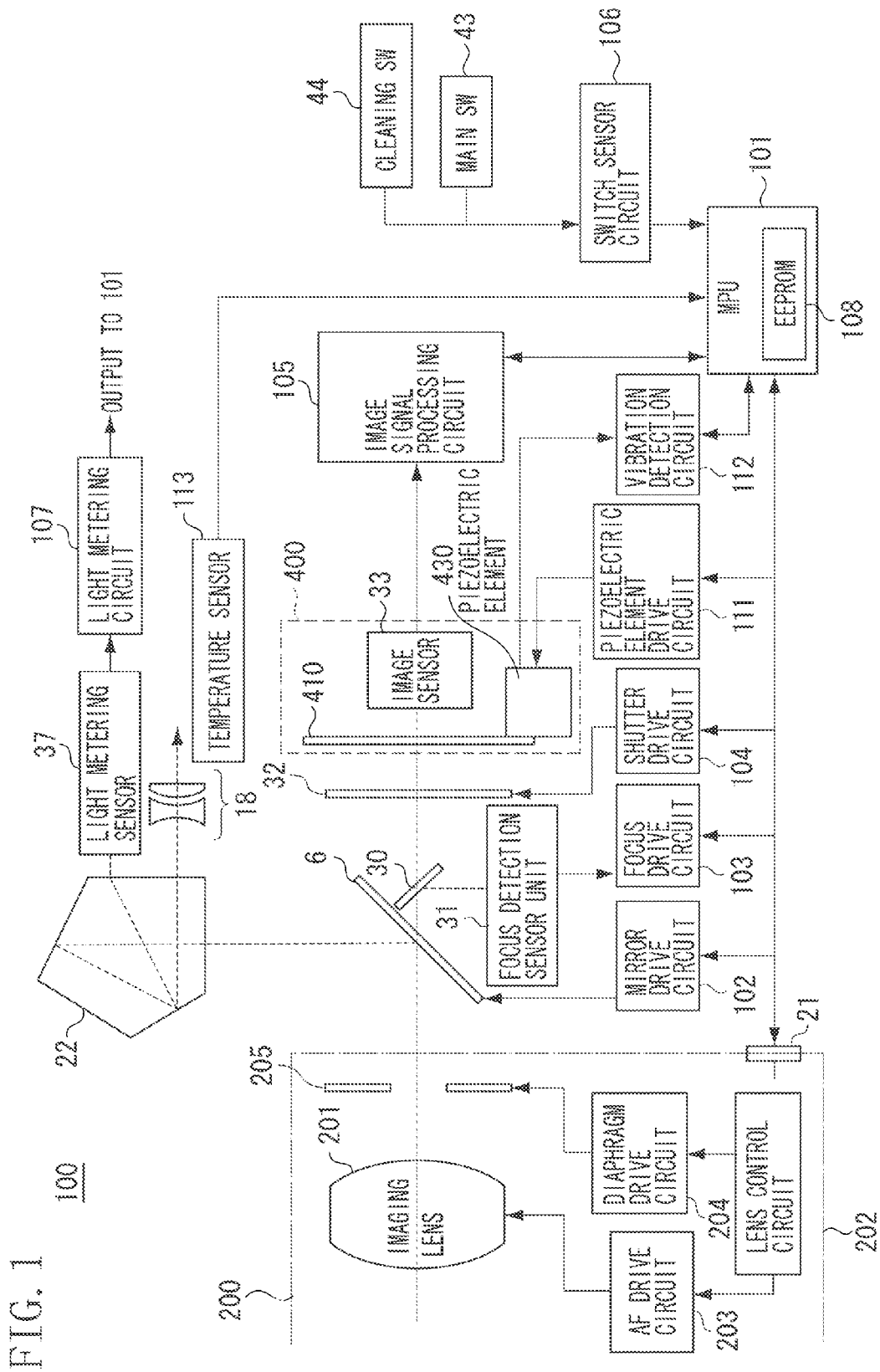
FIG. 1 is a block diagram illustrating a digital single lens reflex camera according to a first exemplary embodiment of the present invention.

FIG. 1 is a block diagram illustrating a functional configuration of a digital camera 100 according to a first exemplary embodiment of the present invention.

A micro computer (hereinafter referred to as "micro processing unit (MPU)") 101 is, for example, a central processing unit, and controls the operations of the respective blocks provided in the digital camera 100. Circuits connected to the MPU 101 include a mirror drive circuit 102, a focus drive circuit 103, a shutter drive circuit 104, an image signal processing circuit 105, a switch sensor circuit 106, a light metering circuit 107, a piezoelectric element drive circuit 111, a vibration detection circuit 112, and a temperature sensor 113. These circuits operate under the control of the MPU 101.

The MPU 101 communicates with a lens control circuit 202 in an imaging lens unit 200 via a mount contact 21. The MPU 101 detects that the MPU 101 is now capable of communicating with the lens control circuit 202 in the imaging lens unit 200 by receiving a signal via the mount contact 21, when the imaging lens unit 200 is connected to the digital camera 100.

The lens control circuit 202 drives the imaging lens 201 and a diaphragm 205 in the imaging lens unit 200 via an automatic focus (AF) drive circuit 203 and a diaphragm drive circuit 204 by receiving a control signal from the MPU 101. For simplification of illustration, FIG. 1 illustrates the imaging lens 201 as if the imaging lens 201 is constituted by only a single lens, but actually, the imaging lens 201 is constituted by a group of a large number of lenses such as a focus lens.

The AF drive circuit 203 includes, for example, a stepping motor, and focuses an imaging light flux on an image sensor 33 by changing the position of the focus lens in the imaging lens 201 under the control of the lens control circuit 202. The diaphragm drive circuit 204 is, for example, a diaphragm mechanism such as an auto iris, and changes the diaphragm amount of the diaphragm 205 under the control of the lens control circuit 202.

A main mirror 6 guides the imaging light flux transmitted through the imaging lens 201 to a pentagonal prism 22 while allowing a part of the imaging light flux to pass through the main mirror 6 to guide it to a sub mirror 30, in such a state that the main mirror 6 is maintained at an angle of 45° relative to an imaging optical axis illustrated in FIG. 1. The sub mirror 30 guides the imaging light flux transmitted through the main mirror 6 to a focus detection sensor unit 31.

The mirror drive circuit 102 includes, for example, a direct current (DC) motor and a gear train, and drives the main mirror 6 to such a position that the main mirror 6 allows a photographer to observe an object image via a finder, and to such a position that the main mirror 6 is retracted from the imaging light flux. When the main mirror 6 is driven, the sub mirror 30 is simultaneously moved to such a position that the sub mirror 30 guides the imaging light flux to the focus detection sensor unit 31, and to such a position that the sub mirror 30 is retracted from the imaging light flux.

The focus detection sensor unit 31 includes, for example, a field lens, a reflection mirror, a second imaging lens, a diaphragm, and a line sensor including a plurality of charge coupled devices (CCDs), which are disposed in the vicinity of an imaging plane (not illustrated). The focus detection sensor unit 31 performs focus detection according to the phase difference detection method. A signal output from the focus detection sensor unit 31 is supplied to the focus drive circuit 103 to be converted into an object image signal, and then is transmitted to the MPU 101.

The MPU 101 performs focus detection calculation according to the phase difference detection method based on the object image signal. More specifically, the MPU 101 calculates a defocus amount and a focusing direction with use of the object image signal, and drives the focus lens in the imaging lens 201 to an in-focus position via the lens control circuit 202 and the AF drive circuit 203 according to the calculated defocus amount and defocus direction.

The pentagonal prism 22 reflects the imaging light flux reflected by the main mirror 6 while converting it into a normal upright image. As a result, the photographer can observe the object image through a finder eyepiece window 18 via a finder optical system.

Further, the pentagonal prism 22 also guides a part of the imaging light flux to a light metering sensor 37. The light metering circuit 107 converts a light metering value output from the light metering sensor 37 into a luminance signal of each area on an observation plane, and then outputs it to the MPU 101. The MPU 101 calculates an exposure value based on the luminance signal.

A shutter unit 32 is, for example, a mechanical focal plane shutter, and is configured so that a shutter first curtain is located at a light shielding position and a shutter second curtain is located at an exposure position when the photographer observes the object image through the finder eyepiece window 18. On the other hand, at the time of shooting, the shutter first curtain performs exposure travelling by moving from the light shielding position to the exposure position, thereby allowing the imaging light flux to pass therethrough. The image sensor 33, which will be described below, photoelectrically converts a formed object image, thereby performing an imaging operation.

Then, after a set exposure time has passed, the shutter second curtain performs light shielding traveling by moving from the exposure position to the light shielding position, thereby completing an imaging operation required to acquire one image data piece. The shutter unit 32 is controlled by the shutter drive circuit 104 that receives a control command from the MPU 101.

The image signal processing circuit 105 applies analog/digital (A/D) conversion processing on an analog image signal output from the image sensor 33, and further, applies various kinds of image processing such as noise removal processing and gain adjustment processing on the thus-acquired digital image data.

The switch sensor circuit 106 transmits to the MPU 101 an input signal input by a photographer's operation of a user interface included in the digital camera 100, such as a main switch (SW) 43 and a cleaning SW 44.

The cleaning SW 44 is a user interface for issuing an instruction to remove a foreign substance such as dust or dirt attached to the surface of an optical low-pass filter 410. The photographer can manually cause a removal operation of the foreign substance on the filter by operating the cleaning SW 44.

An imaging unit 400, which is a foreign substance removal apparatus, is a block constructed by assembling the members including the optical low-pass filter 410, a piezoelectric element 430, and the image sensor 33 to form one unit. The optical low-pass filter 410 corresponds to an optical member.

The image sensor 33 is, for example, an imaging device such as a complementary metal-oxide semiconductor (CMOS) sensor or CCD sensor. The image sensor 33 outputs the analog image signal by photoelectrically converting the formed optical image of the object, as mentioned above.

The piezoelectric element 430 is, for example, a single-plate piezoelectric element such as a piezo element. The piezoelectric element 430 is configured to be vibrated by the piezoelectric element drive circuit 111 that receives a control signal from the MPU 101, and transmit the vibration to the optical low-pass filter 410.

The MPU 101 and the piezoelectric element drive circuit 111 function as a drive unit. The vibration detection circuit 112 functions as a vibration detection unit which detects a vibration of the optical low-pass filter 410. The temperature sensor 113 functions as a temperature detection unit which detects a temperature surrounding the optical member.

Figure 2:
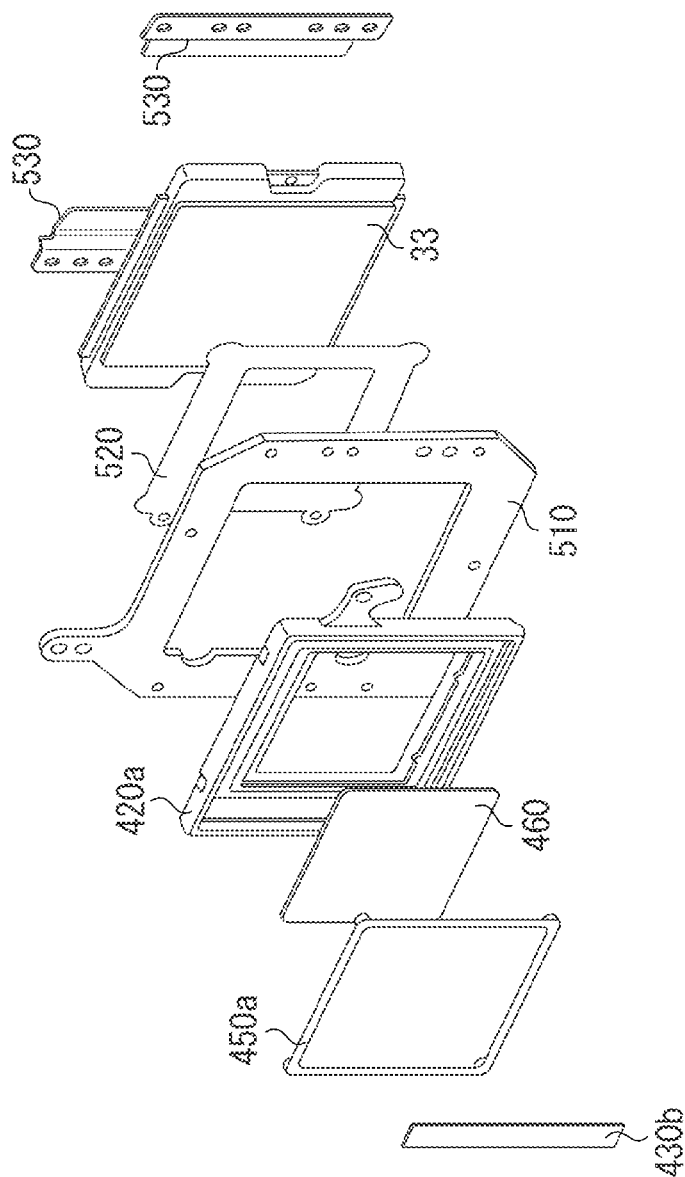
FIG. 2 illustrates an outer appearance of the digital single lens reflex camera according to the first exemplary embodiment.

Now, the imaging unit 400, which is a foreign substance removal unit configured to remove the foreign substance on the filter by vibrating the optical low-pass filter 410, will be described in further detail with reference to FIG. 2. FIG. 2 is an exploded perspective view schematically illustrating the configuration of the imaging unit 400.

The optical low-pass filter 410 disposed in front of the image sensor 33 is a single birefringent plate made from crystal, and has a rectangular shape. The optical low-pass filter 410 is disposed in an optical path, and is a rectangular optical member in which an optical effective area allowing transmittance of a light flux is set.

The optical low-pass filter 410 has a peripheral portion where a pair of piezoelectric elements 430a and 430b is disposed outside the optical effective area, and is symmetrical in the direction perpendicular to the center of the imaging optical axis (i.e., the camera lateral direction). An optical coating such as an infrared cut coating or a reflection prevention coating is applied on the surface of the thus-configured optical low-pass filter 410.

As will be described below, the piezoelectric elements 430a and 430b each include a plurality of electrodes integrally formed on a single piezoelectric member, and have an elongated rectangular contour. The piezoelectric elements 430a and 430b are disposed along the two opposite short sides of the optical low-pass filter 410, respectively.

More specifically, the piezoelectric element 430a is bonded to the optical low-pass filter 410 in such a manner that the long side of the piezoelectric element 430a, which is a first piezoelectric element, extends in parallel with one short side (one end) of the optical low-pass filter 410 at the peripheral portion of the optical low-pass filter 410. On the other hand, the piezoelectric element 430b is bonded to the optical low-pass filter 410 in such a manner that the long side of the piezoelectric element 430b, which is a second piezoelectric element, extends in parallel with the other short side (the other end) of the optical low-pass filter 410 at the peripheral portion of the optical low-pass filter 410.

The optical low-pass filter 410 is vibrated in a wavelike manner with a plurality of anti-nodes and a plurality of nodes generated in parallel with the side of the optical low-pass filter 410. A periodic voltage is applied to the piezoelectric elements 430a and 430b so that the piezoelectric elements 430a and 430b performs contraction/extension movements. These movements then cause the optical low-pass filter 410 to also perform a periodic bending deformation. The state of the vibration will be described concretely below.

An optical low-pass filter holding member 420 is made from a resin or a metal, and serves to hold the optical low-pass filter 410. The optical low-pass filter holding member 420 is fixed to an image sensor holding member 510 with use of screws.

A biasing member 440 biases the optical low-pass filter 410 toward the image sensor 33. The biasing member 440 is engaged with the optical low-pass filter holding member 420. The biasing member 440 is electrically connected to the portion (ground) of the digital camera 100 that has a ground potential.

The surface of the optical low-pass filter 410 is also electrically connected to the portion (ground) of the digital camera 100 that has a ground potential. Due to these connections, it is possible to prevent a foreign substance such as dust or dirt from being electrostatically attached to the surface of the optical low-pass filter 410.

An elastic member 450 has a frame shape substantially circular in cross-section, and is sandwiched between the optical low-pass filter 410 and the optical low-pass filter holding member 420. The biasing member 440 biases the optical low-pass filter 410, which causes the elastic member 450 to be compressed between the optical low-pass filter 410 and the optical low-pass filter holding member 420.

Therefore, the strength of the force for compressing the elastic member 450 is set based on the biasing force that the biasing member 440 applies toward the image sensor 33. The elastic member 450 may be made of a rubber material or a urethane foam material such as PORON (registered trademark).

An optical member 460 is an optical member constructed by bonding a phase plate (depolarization plate), an infrared cut filter, and a birefringent plate having a different refraction direction from the optical low-pass filter 410 by 90°. The optical member 460 is adhesively fixed to the optical low-pass filter holding member 420.

The image sensor holding member 510 has a rectangular opening formed therethrough, where the image sensor 33 is fixedly held while being maintained in an exposed state. The image sensor holding member 510 is fixed to the main body of the digital camera 100 with, for example, screws.

A mask 520 is held by being sandwiched between the optical low-pass filter holding member 420 and the image sensor 33 to prevent an entry of excess light from the outside of the photographic optical path into the image sensor 33.

Image sensor biasing members 530 are a pair of right and left biasing members constituted by plate springs. The image sensor biasing members 530 are fixed to the image sensor holding member 510 by screws, and press the image sensor 33 against the image sensor holding member 510.

The optical low-pass filter 410 is configured in this way, as a result of which the optical low-pass filter 410 is supported so as to be capable of vibrating while being sandwiched between the biasing member 440 and the elastic member 450.

Figure 3:
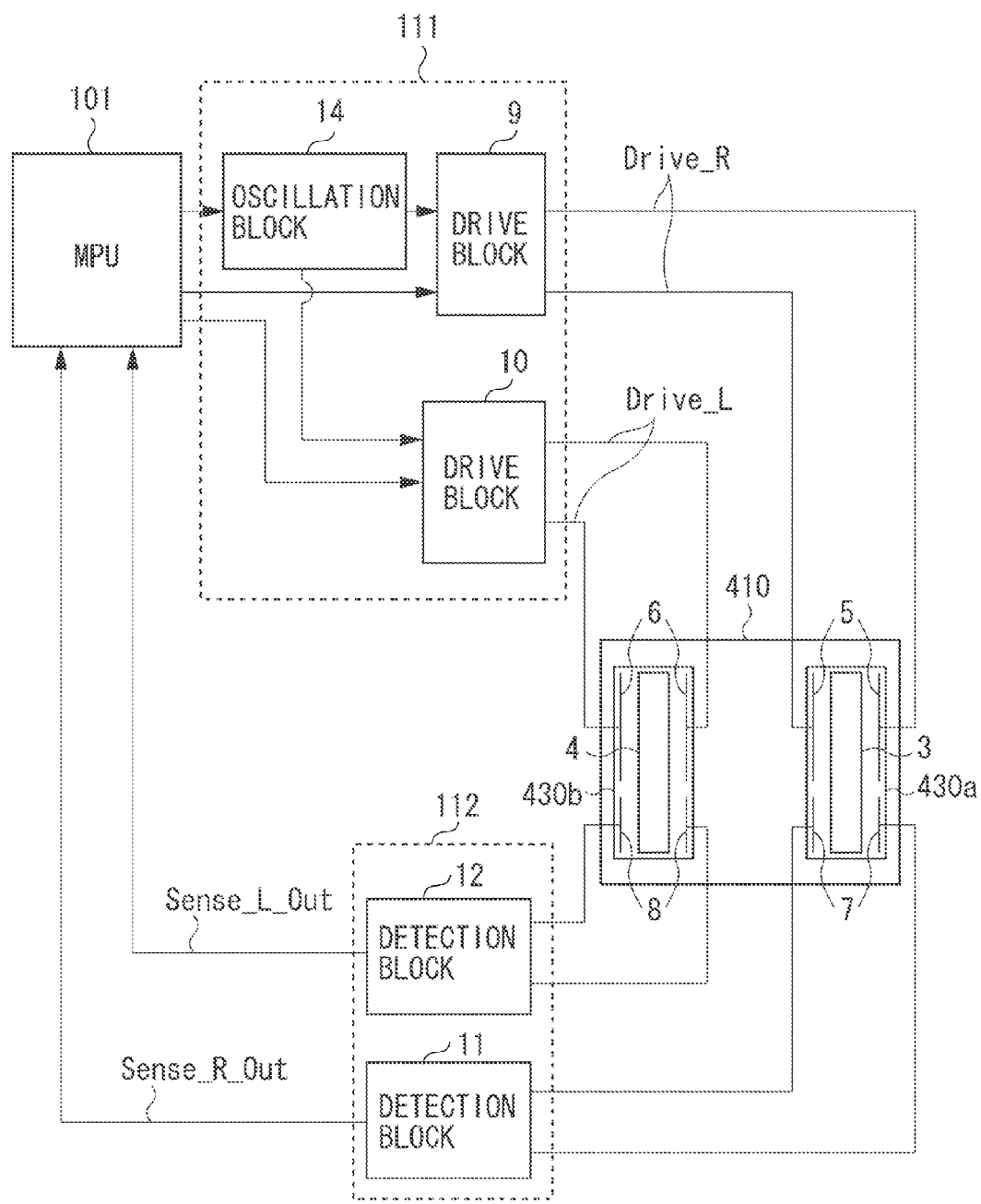
FIG. 3 is a block diagram illustrating main parts of a foreign substance removal apparatus.

FIG. 3 is a block diagram illustrating main parts of the foreign substance removal apparatus. As illustrated in FIG. 3, the piezoelectric element 430a includes a piezoelectric member 3, and a drive electrode 5 and a detection electrode 7 formed on each of the front and back surfaces of the piezoelectric member 3. The piezoelectric element 430b includes a piezoelectric member 4, and a drive electrode 6 and a detection electrode 8 formed on each of the front and back surfaces of the piezoelectric member 4.

The piezoelectric element 430a corresponds to a first piezoelectric element, and the piezoelectric element 430b corresponds to a second piezoelectric element. Further, the drive electrode 5 corresponds to a first drive electrode, and the drive electrode 6 corresponds to a second drive electrode. Further, the detection electrode 7 corresponds to a first detection electrode, and the detection electrode 8 corresponds to a second detection electrode.

The piezoelectric element drive circuit 111 includes drive blocks 9 and 10, and an oscillation block 14. The drive block 9 supplies a driving signal Drive_R to the drive electrode 5 formed on the piezoelectric element 430*a*. The drive block 10 supplies a driving signal Drive_L to the drive electrode 6 formed on the piezoelectric element 430*b*.

The oscillation block 14 outputs a high-frequency signal to the drive blocks 9 and 10, and is controlled by the MPU 101 to thereby change the oscillation frequency to be output. The oscillation block 14 outputs the high-frequency signal to each of the drive blocks 9 and 10.

The driving signal Drive_R output from the drive block 9 and the driving signal Drive_L output from the drive block 10 are different in phase with each other. The MPU 101 controls a voltage that the drive blocks 9 and 10 supply to the drive electrodes 5 and 6.

The vibration detection circuit 112 includes detection blocks 11 and 12. The detection block 11 detects a vibration of the optical low-pass filter 410 based on an output from the detection piezoelectric element 7. The detection block 12 detects a vibration of the optical low-pass filter 410 based on an output from the detection piezoelectric element 8.

The detection block 11 outputs a detection signal Sense_R_Out. The detection block 12 outputs a detection signal Sense_L_Out. The detection signals Sense_R_Out and Sense_L_Out are input into the MPU 101.

Next, the operation of the foreign substance removal apparatus will be described.

The MPU 101 provides the oscillation block 14 with a frequency required to drive the piezoelectric elements 430*a* and 430*b*, and a control signal indicating an amount of a phase difference between an output to the drive block 9 and an output to the drive block 10. The oscillation block 14 outputs a high-frequency signal to the drive blocks 9 and 10 based on the input frequency and the control signal indicating the phase difference amount.

The drive block 9 outputs the driving signal Drive_R to the drive electrode 5. The MPU 101 controls a voltage that the drive block 9 supplies to the drive electrode 5. The MPU 101 controls a voltage that the drive block 10 supplies to the drive electrode 6.

The MPU 101 can independently control driving of the piezoelectric element 430*a* and driving of the piezoelectric element 430*b* by providing the drive blocks 9 and 10 with a driving allowance/prohibition signal to allow the drive blocks 9 and 10 to drive the piezoelectric elements 430*a* and 430*b* or prohibit the drive blocks 9 and 10 from driving the piezoelectric elements 430*a* and 430*b*.

When the MPU 101 provides the drive block 9 with the signal to allow the drive block 9 to drive the piezoelectric element 430*a*, the drive block 9 outputs the driving signal Drive_R to the drive electrode 5 based on the oscillation frequency specified by the MPU 101 and the voltage specified by the MPU 101.

When the MPU 101 provides the drive block 10 with the signal to allow the drive block 10 to drive the piezoelectric element 430*b*, the drive block 10 outputs the driving signal Drive_L to the drive electrode 6 based on the oscillation frequency specified by the MPU 101 and the voltage specified by the MPU 101.

At this time, the MPU 101 changes the frequency and the control signal indicating the phase difference amount to be output to the oscillation block 14, thereby changing the oscillation frequency and the phase difference amount to be output from the oscillation circuit 14. These changes lead to changes in the driving signal Drive_R output from the drive block 9 and the driving signal Drive_L output from the drive block 10.

In this way, it is possible to generate a traveling wave having the largest amplitude at the optical low-pass filter 410 by changing the frequency and the phase difference amount that the MPU 101 outputs to the oscillation block 14.

When a vibration is generated at the optical low-pass filter 410, signals are output from the detection electrodes 7 and 8. The signal generated from the detection electrode 7 is converted into the detection signal Sense_R_Out by the detection block 11, which can be detected by the MPU 101, and then is input into the MPU 101.

Similarly, the signal generated from the detection electrode 8 is converted into the detection signal Sense_L_Out by the detection block 12, which can be detected by MPU 101, and then is input into the MPU 101. The MPU 101 can detect the amplitude of a traveling wave generated at the optical low-pass filter 410 from the detection signals Sense_R_Out and Sense_L_Out.

In this way, the MPU 101 can detect a change in the amplitude of the traveling wave generated at the optical low-pass filter 410 while changing the frequency and the phase difference amount to be output to the oscillation block 14.

FIG. 4 is a timing chart illustrating a preliminary driving operation and a foreign substance removal driving operation. In FIG. 4, the vertical axis represents the driving voltage, and the horizontal axis represents the driving time.

During execution of the preliminary driving operation, a voltage of 40 V is supplied to the drive electrodes 5 and 6 for a time of 20 ms. The voltage 40 V corresponds to a first voltage, and the time 20 ms corresponds to a first power supply time.

On the other hand, during execution of the foreign substance removal driving operation, a voltage of 120 V is supplied to the drive electrodes 5 and 6 for a time of 500 ms. During the execution of the foreign substance removal driving operation, the piezoelectric elements 430*a* and 430*b* are driven under these conditions four times. The voltage 120 V corresponds to a second voltage, and the time 500 ms corresponds to a second power supply time.

FIG. 5A illustrates the driving signal Drive_L output from the drive block 10 and the driving signal Drive_R output from the drive block 9 during execution of the preliminary driving operation. FIG. 5B illustrates the detection signal Sense_L_Out output from the detection block 12 and the detection signal Sense_R_Out output from the detection block 11 during execution of the preliminary driving operation.

As illustrated in FIG. 5A, a phase difference of 90° is generated between the output of the driving signal Drive_L from the drive block 10 and the output of the driving signal Drive_R from the drive block 9. At this time, a driving phase difference amount is 90°.

As illustrated in FIGS. 5A and 5B, a phase lag of A° is generated from the output of the driving signal Drive_L from the drive block 10 until the output of the detection signal Sense_L_Out from the detection block 12.

Similarly, a phase lag of B° is generated from the output of the driving signal Drive_R from the drive block 9 until the output of the detection signal Sense_R_Out from the detection block 11. The MPU 101 measures (B°−A°). This difference (B°—A°) corresponds to a detected phase difference amount. Then, the MPU 101 corresponds to a measuring unit for measuring the detected phase difference amount.

In the example illustrated in FIGS. 5A and 5B, the difference (B°−A°) measured by the MPU 101 is 90°±α. Therefore, the detected phase difference amount is 90°±α. It should be noted that the voltage supplied to the drive electrodes 5 and 6 during the preliminary driving operation is lower than the voltage supplied to the drive electrodes 5 and 6 during the foreign substance removal driving operation.

Further, the power supply time of supplying power to the drive electrodes 5 and 6 during the preliminary driving operation is shorter than the power supply time of supplying power to the drive electrodes 5 and 6 during the foreign substance removal driving operation. Therefore, even with the detected phase difference amount of 90°±α, this does not result in breakage of the optical low-pass filter 410.

Reasons why the detected phase difference amount cannot be 90° include the individual difference of the optical low-pass filter 410, the state in which the piezoelectric elements 430a and 430b are attached to the optical low-pass filter 410, and the ambient temperature around the optical low-pass filter 410.

The MPU 101 changes the driving phase difference amount so as to reduce this correction value α. More specifically, the MPU 101 calculates the driving phase difference amount so that the correction amount α falls within the range of allowable phase difference amount. Then, at the time of execution of the foreign substance removal driving operation, the MPU 101 outputs the driving phase difference amount calculated in the preliminary driving operation to the oscillation block 14.

As a result, during execution of the foreign substance removal driving operation, the drive blocks 9 and 10 can output the driving signals Drive_R and Drive_L so that the detected phase difference amount approaches 90°. Therefore, even if a high voltage is supplied to the drive electrode 5 and 6 for a long time, this does not result in breakage of the optical low-pass filter 410.

The foreign substance removal operation according to the present exemplary embodiment will be described with reference to FIGS. 6A, 6B, and 6C. FIG. 6A is a main flowchart of the foreign substance removal operation according to the present exemplary embodiment.

In step S100, the main flow of the foreign substance removal operation is started.

In step S110, the switch sensor circuit 106 detects a turning-on operation of the cleaning SW 44 (YES in step S110), and then the processing proceeds to step S120

In step S120, the MPU 101 detects the internal temperature of the digital camera 100 based on an output from the temperatures sensor 113.

In step S130, the MPU 101 reads out the temperature data stored in an electrically erasable programmable read-only memory (EERPOM) 108. The EEPROM 108 stores phase difference amounts calculated based on previous preliminary driving operations, and the temperature data at the time of execution of the preliminary driving operations in such a manner that the phase difference amounts and the corresponding temperature data are associated with each other.

In step S140, the MPU 101 determines whether the internal temperature of the digital camera 100 detected in step S120 is within any of predetermined temperature ranges set based on the temperatures stored in the EEPROM 108. If the internal temperature of the digital camera 100 is within any of the temperature ranges (YES in step S140), the processing proceeds to step S170. If the internal temperature of the digital camera 100 is not within any of the temperature ranges (NO in step S140), the processing proceeds to step S150.

In step S150, the MPU 101 determines whether the elapsed time from the execution of the foreign substance removal operation is within a predetermined time range set in advance. If the elapsed time from execution of the foreign substance removal operation is within the predetermined time range (YES in step S150), the processing proceeds to step S170. If the elapsed time from the execution of the foreign substance removal operation is not within the predetermined time range (NO in step S150), the processing proceeds to step S160.

In step S160, the MPU 101 executes the preliminary driving operation. The details of the preliminary driving operation will be described below.

In step S170, the MPU 101 executes the foreign substance removal driving operation. The details of the foreign substance removal driving operation will be described below.

In step S180, the MPU 101 starts a time count. As a result, it is possible to measure the elapsed time since the foreign substance removal operation is performed. In other words, the MPU 101 functions as a time counter unit which measures the elapsed time since the piezoelectric elements 430a and 430b are driven. Then, in step S190, the main flow of the foreign substance removal operation is ended.

FIG. 6B is a sub flowchart illustrating the details of the preliminary driving operation indicated in step S160 according to the present exemplary embodiment.

In step S200, the sub flow of the preliminary driving operation is started.

In step S210, the MPU 101 sets the voltage and the power supply time for power application from the drive blocks 9 and 10 to the drive electrodes 5 and 6.

In the present exemplary embodiment, the drive blocks 9 and 10 supplies 40 V to the drive electrodes 5 and 6, and the power supply time is 20 ms. The power supply time of 20 ms corresponds to a first power supply time. During the preliminary driving operation, it is sufficient to vibrate the optical low-pass filter 410 with just the amplitude allowing the detection blocks 11 and 12 to detect the vibration.

Further, the MPU 101 sets the driving phase difference amount X, which is a phase difference from an output of the driving signal Drive_L until an output of the driving signal Drive_R, to 90°, and also sets the allowable detected phase difference amount C to 5° (i.e., C=5). The driving phase difference amount X set to 90° here corresponds to a first driving phase difference amount.

In other words, in the present exemplary embodiment, the driving phase difference amount X is adjusted so that the detected phase difference amount, which is a difference from an output of the detection signal Sense_L_Out to an output of the detection signal Sense_R_Out, falls within the range of 90°±5°

In step S220, the MPU 101 causes the drive block 10 to output the driving signal Drive_L and the drive block 9 to output the driving signal Drive_R based on the phase difference amount X set in step S210 or step S250.

In step S230, the MPU 101 detects the phase lag A° from the output of the driving signal Drive_L output from the drive block 10 until the output of the detection signal Sense_L_Out output from the detection block 12 illustrated in FIGS. 5A and 5B.

Similarly, the MPU 101 detects the phase lag B° from the output of the driving signal Drive_R output from the drive block 9 until the output of the detection signal Sense_R_Out output from the detection block 11. Then, the MPU 101 measures the detected phase difference amount (B°−A°).

After that, the MPU 101 calculates the correction amount α indicating how much the measured detected phase difference amount (B°−A°) deviates from the driving phase difference amount X.

In step S240, the MPU 101 determines whether the correction amount α is within the range of ±5°. If the correction amount α is within the range of ±5° (YES in step S240), the processing proceeds to step S260. If the correction amount α is not within the range of ±5° (NO in step S240), the processing proceeds to step S250.

In step S250, the MPU 101 adjusts the driving phase difference amount X so that the correction amount α falls within the range of ±5°. Then, the processing proceeds to step S220.

In step S260, the MPU 101 sets the driving phase difference amount X that achieves the correction amount α within the range of ±5°. The driving phase difference amount X set in step S260 corresponds to a second driving phase difference amount.

In step S270, the MPU 101 stores the driving phase difference amount X set in step S260 in the EEPROM 108 in such a manner that the driving phase difference amount X is associated with the temperature range set based on the temperature data detected in step S120, and the setting date and time of the driving phase difference mount X set in step S260.

In step S280, the sub flow of the preliminary driving operation is ended, and the processing returns to the main flow.

FIG. 6C is a sub flowchart illustrating the details of the foreign substance removal driving operation indicated in step S170 according to the present exemplary embodiment.

In step S300, the sub flow of the foreign substance removal driving operation is started.

In step S310, the MPU 101 reads out the driving phase difference amount X set in step S260 from the EEPROM 108. More specifically, if the temperature detected in step S120 falls within any of the temperature ranges stored in the EEPROM 108, the MPU 101 reads out the set driving phase difference amount X that is associated with the temperature range within which the temperature detected in step S120 falls.

If the temperature detected in step S120 does not fall within any of the temperature ranges stored in the EEPROM 108, the MPU 101 reads out the driving phase difference amount X having the latest date and time as the date and time when the driving phase difference amount X is set.

In step S320, the MPU 101 sets the driving phase difference amount X read out in step S310, and also sets the voltage and the power supply time for power application from the drive blocks 9 and 10 to the drive electrodes 5 and 6. In the present exemplary embodiment, for example, the MPU 101 sets 120 V and 500 ms as the voltage that the drive blocks 9 and 10 supply to the drive electrodes 5 and 6, and the power supply time therefor, respectively. The power supply time of 500 ms here corresponds to a second power supply time.

During the foreign substance removal driving operation, increasing a voltage to be supplied to the drive electrodes 5 and 6, and applying such a voltage for a long power supply time lead to an increase in the possibility of succeeding in removing a foreign substance attached to the optical low-pass filter 410, so that a maximally increased voltage is applied to the drive electrodes 5 and 6.

In step S330, the MPU 101 increments a repetition count n of the foreign substance removal driving operation.

In step S340, the drive block 10 outputs the driving signal Drive_L, and the drive block 9 outputs the driving signal Drive_R according to the conditions set in step S320.

In step S350, the MPU 101 determines whether the repetition count n of the foreign substance removal driving operation reaches a preset value. If the repetition count n of the foreign substance removal driving operation reaches the preset value (YES in step S350), the processing proceeds to step S360. If the repetition count n of the foreign substance removal driving operation does not reach the preset value (NO in step S350), the processing proceeds to step S330. In the present exemplary embodiment, if the repetition count n does not reach 4 (NO in step S350), the processing proceeds to step S330. If the repetition count n reaches 4 (YES in step S350), the processing proceeds to step S360.

In step S360, the sub flow of the foreign substance removal driving operation is ended, and the processing returns to the main flow.

A second exemplary embodiment of the present invention is a digital camera including the foreign substance removal apparatus. The configuration of the digital camera in the second exemplary embodiment is similar to that in the first exemplary embodiment illustrated in FIGS. 1 to 3, and therefore the description thereof will be omitted here. A difference between the first exemplary embodiment and the second exemplary embodiment is the contents of the foreign substance removal driving operation indicated in step S170.

Figure 7:
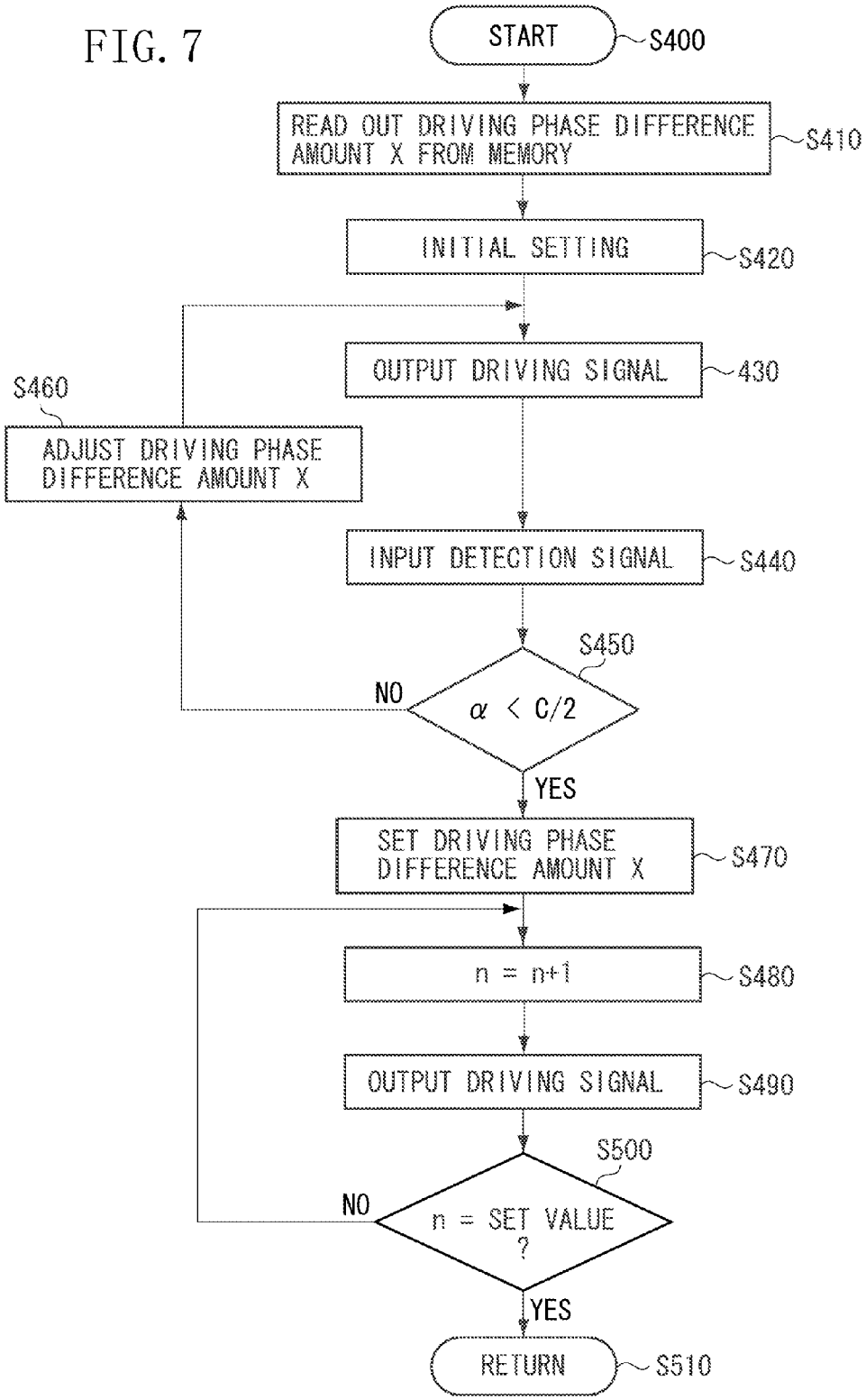
FIG. 7 is a flowchart illustrating a foreign substance removal driving operation according to a second exemplary embodiment.

FIG. 7 is a sub flowchart illustrating the details of the foreign substance removal driving operation illustrated in step S170 according to the second exemplary embodiment of the present invention.

In step S400, the sub flow of the foreign substance removal driving operation is started.

In step S410, the MPU 101 reads out the driving phase difference amount X set in step S260 from the EEPROM 108.

More specifically, if the temperature detected in step S120 falls within any of the temperature ranges stored in the EEPROM 108, the MPU 101 reads out the set driving phase difference amount X that is associated with the temperature range within which the temperature detected in step S120 falls. If the temperature detected in step S120 does not fall within any of the temperature ranges stored in the EEPROM 108, the MPU 101 reads out the driving phase difference amount X having the latest date and time as the setting date and time of the driving phase difference amount X.

In step S420, the MPU 101 sets the driving phase difference amount X read out in step S410, and also sets the voltage and the power supply time for power application from the drive blocks 9 and 10 to the drive electrodes 5 and 6. In the present exemplary embodiment, for example, the MPU 101 sets 120 V and 500 ms as the voltage that the drive blocks 9 and 10 supply to the drive electrodes 5 and 6 and the power supply time therefor, respectively.

In step S430, the MPU 101 causes the drive block 10 to output the driving signal Drive_L and the drive block 9 to output the driving signal Drive_R based on the phase difference amount X set in step S420 or S460.

In step S440, the MPU 101 detects the phase lag A° from the output of the driving signal Drive_L from the drive block 10 until the output of the detection signal Sense_L_Out from the detection block 12. Similarly, the MPU 101 detects the phase lag B° from the output of the driving signal Drive_R from the drive block 9 until the output of the detection signal Sense_R_Out from the detection block 11. Then, the MPU 101 calculates the correction amount α which indicates how much the detected phase difference amount (B°−A°) deviates from the driving phase difference amount X.

In step S450, the MPU 101 determines whether the correction amount α is within the range of ±2.5°. If the correction amount α is within the range of ±2.5° (YES in step S450), the processing proceeds to step S470. If the correction amount α is not within the range of ±2.5° (NO in step S450), the processing proceeds to step S460.

In step S460, the MPU 101 adjusts the driving phase difference amount X so that the correction amount α falls within the range of ±2.5°. Then, the processing proceeds to step S430.

In step S470, the MPU 101 sets the driving phase difference amount X that achieves the correction amount α within the range of ±2.5°.

In step S480, the MPU 101 increments the repetition count n of the foreign substance removal driving operation.

In step S490, the drive block 10 outputs the driving signal Drive_L, and the drive block 9 outputs the driving signal Drive_R according to the driving phase difference amount X set in step S470.

In step S500, the MPU 101 determines whether the repetition count n of the foreign substance removal driving operation reaches a preset value. If the repetition count n of the foreign substance removal driving operation reaches the preset value (YES in step S500), the processing proceeds to step S510. If the repetition count n of the foreign substance removal driving operation does not reach the preset value (NO in step S500), the processing proceeds to step S480. In the present exemplary embodiment, if the repetition count n does not reach 4 (NO in step S500), the processing proceeds to step S480. If the repetition count n reaches 4 (YES in step S500), the processing proceeds to step S510.

In step S510, the sub flow of the foreign substance removal driving operation is ended, and the processing returns to the main flow.

According to the second exemplary embodiment, the driving phase difference amount X is reset according to a stricter condition at the time of the first power application during the foreign substance removal driving operation than the condition from the preliminary driving operation. As a result, it is possible to generate a further stabilized traveling wave at the optical low-pass filter 410.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-059218 filed Mar. 17, 2011, which is hereby incorporated by reference herein in its entirety.

What is claimed is:

1. A foreign substance removal apparatus comprising:
an optical member;
a first piezoelectric element attached to the optical member and including a first drive electrode and a first detection electrode formed thereon;
a second piezoelectric element attached to the optical member and including a second drive electrode and a second detection electrode formed thereon;
a drive unit configured to apply power to the first drive electrode to drive the first piezoelectric element, and apply power to the second drive electrode to drive the second piezoelectric element;
a vibration detection unit configured to detect a vibration of the optical member based on outputs from the first detection electrode and the second detection electrode;
a setting unit configured to set an amount of a driving phase difference between power application to the first drive electrode and power application to the second drive electrode; and
a measuring unit configured to measure an amount of a detected phase difference between detection of the vibration of the optical member by the vibration detection unit based on the output from the first detection electrode, and detection of the vibration of the optical member by the vibration detection unit based on the output from the second detection electrode,
wherein the setting unit sets a first driving phase difference amount to be set in advance,
wherein the setting unit sets a second driving phase difference amount based on the detected phase difference amount measured by the measuring unit when the setting unit sets the first driving phase difference amount,
wherein the drive unit applies a first voltage to the first drive electrode and the second drive electrode when the setting unit sets the first driving phase difference amount,
wherein the drive unit applies a second voltage to the first drive electrode and the second drive electrode when the setting unit sets the second driving phase difference amount, and wherein the first voltage is lower than the second voltage.

2. The foreign substance removal apparatus according to claim 1, wherein the drive unit applies the first voltage to the first drive electrode and the second drive electrode for a first power supply time when the setting unit sets the first driving phase difference amount,
wherein the drive unit applies the second voltage to the first drive electrode and the second drive electrode for a second power supply time when the setting unit sets the second driving phase difference amount, and
wherein the first power supply time is shorter than the second power supply time.

3. The foreign substance removal apparatus according to claim 1, wherein the setting unit determines the second driving phase difference amount based on a difference between the first driving phase difference amount and the detected phase difference amount measured by the measuring unit.

4. The foreign substance removal apparatus according to claim 3, wherein the setting unit determines the second driving phase difference amount so as to reduce the difference between the first driving phase difference amount and the detected phase difference amount measured by the measuring unit.

* * * * *